United States Patent [19]

Diamant et al.

[11] 4,346,596

[45] Aug. 31, 1982

[54] MILK FLOW MEASUREMENT APPARATUS

[75] Inventors: Emanuel Diamant; Lev Diamant; Benjamin Grushko, all of Upper Galilee, Israel

[73] Assignee: Mahanaim Diuk Hydraulica, Kibbutz Mahanaim, Israel

[21] Appl. No.: 170,085

[22] Filed: Jul. 18, 1980

[30] Foreign Application Priority Data

Sep. 7, 1979 [IL] Israel ................................ 58203

[51] Int. Cl.³ .................... G01F 1/22; G01F 15/08
[52] U.S. Cl. .................................... 73/200; 73/215
[58] Field of Search .................... 73/200, 215, 216

[56] References Cited

U.S. PATENT DOCUMENTS

| | | | |
|---|---|---|---|
| 1,152,019 | 8/1915 | Gibson | 73/215 |
| 2,165,705 | 7/1939 | Houser | 73/215 |
| 2,697,944 | 12/1954 | Wenham | 73/216 |
| 2,767,581 | 10/1956 | Moorehead | 73/215 |
| 3,392,580 | 7/1968 | Bain et al. | 73/200 X |
| 3,929,412 | 12/1975 | Villari | 73/215 |
| 4,061,031 | 12/1977 | Grimsrud | 73/200 |

FOREIGN PATENT DOCUMENTS

| | | | |
|---|---|---|---|
| 2447261 | 3/1976 | Fed. Rep. of Germany | 73/215 |
| 52-11059 | 1/1977 | Japan | 73/215 |

Primary Examiner—Herbert Goldstein
Attorney, Agent, or Firm—Cushman, Darby & Cushman

[57] ABSTRACT

Apparatus for milk flow measurement comprising debubbling apparatus for receiving milk which may contain bubbles and for removing bubbles therefrom, measuring apparatus receiving milk from the debubbling apparatus and having an outlet the rate of outflow therethrough being a predetermined function of the amount of milk contained therein, and apparatus for sensing the amount of milk contained in the measuring apparatus, thereby to determine the rate of flow.

12 Claims, 6 Drawing Figures

MILK FLOW MEASUREMENT APPARATUS

FIELD OF THE INVENTION

The present invention relates to agricultural equipment and more particularly to apparatus for milk flow measurement.

BACKGROUND OF THE INVENTION

In present-day mechanized and automated agriculture, a need has been recognized for accurate record keeping of the output of a dairy herd and sensing of the milk flow. Sensing of the milk flow is important for the automatic termination of vacuum milking operations as well as timing of the automatic detachment of the milking apparatus from the cow. Milk flow sensors, which sense the drop off in milk flow, indicating a termination of milking, are known. One example is a milking controller manufactured by Alfa-Laval of Sweden. This device does not measure the total amount of milk flow.

One example of apparatus for milk flow measurement is described in Form No. 9P-304 (Catalog) of DEC Diary Equipment Co. of Madison Wisconsin, U.S.A. and is known as the Bou-matic System 2000. The metering system included therein is a complex one, incorporating rotating chambers whose passage is sensed by a photoelectric sensor.

Another example of apparatus for milk flow measurement is disclosed in a catalog of Afikim Agricultural Equipment of Kibutz Afikim, Israel. This apparatus also employs a mechanical metering chamber.

Both devices described above suffer from the disadvantage that they incorporate mechanically operative components which are liable to wear, breakdown and inaccuracy due to improper mechanical operation.

SUMMARY OF THE INVENTION

The present invention seeks to provide milk flow measurement apparatus which overcomes the deficiencies of the prior art devices described above and which is particularly suitable for use with a common milk flow line in continuous operation at high accuracy, due to the fact that it contains no moving parts.

There is thus provided in accordance with an embodiment of the present invention apparatus for milk flow measurement comprising milk debubbling apparatus arranged to receive a flow of milk which may contain bubbles; a container for receiving debubbled milk and having an outlet the rate of outflow of which is a known function of the amount of debubbled milk contained therein; and apparatus for determining the amount of debubbled milk contained in the container at selected times, thereby to indicate the flow.

Further in accordance with an embodiment of the present invention the milk flow measurement apparatus comprises an outer container which receives a flow of milk which may contain bubbles and an inner column coupled to the outer container adjacent the bottom thereof for receiving debubbled milk. The inner column is formed with a vertical slit which permits milk outflow therefrom at a rate which is a function of the height of the milk in the inner column. A milk height sensor, such as a capacitive sensor is disposed within the inner column for measuring the height of the milk therein.

Additionally in accordance with an embodiment of the present invention the milk height sensor is electrically coupled to recording, computing and display circuitry, which is capable of providing a sensible indication of the total amount of milk received from a given cow, and recording such information as well as controlling the milking function in accordance with the flow rate information sensed by the apparatus.

It is to be understood that the terms debubbling and debubbled are intended to mean that substantially all of the bubbles have been removed from the milk to the extent produced by the illustrated apparatus.

BRIEF DESCRIPTION OF THE DRAWINGS

The invention will be more fully understood and appreciated from the following detailed description taken in conjunction with the drawing in which.

DETAILED DESCRIPTION OF A PREFERRED EMBODIMENT

Figure 1:
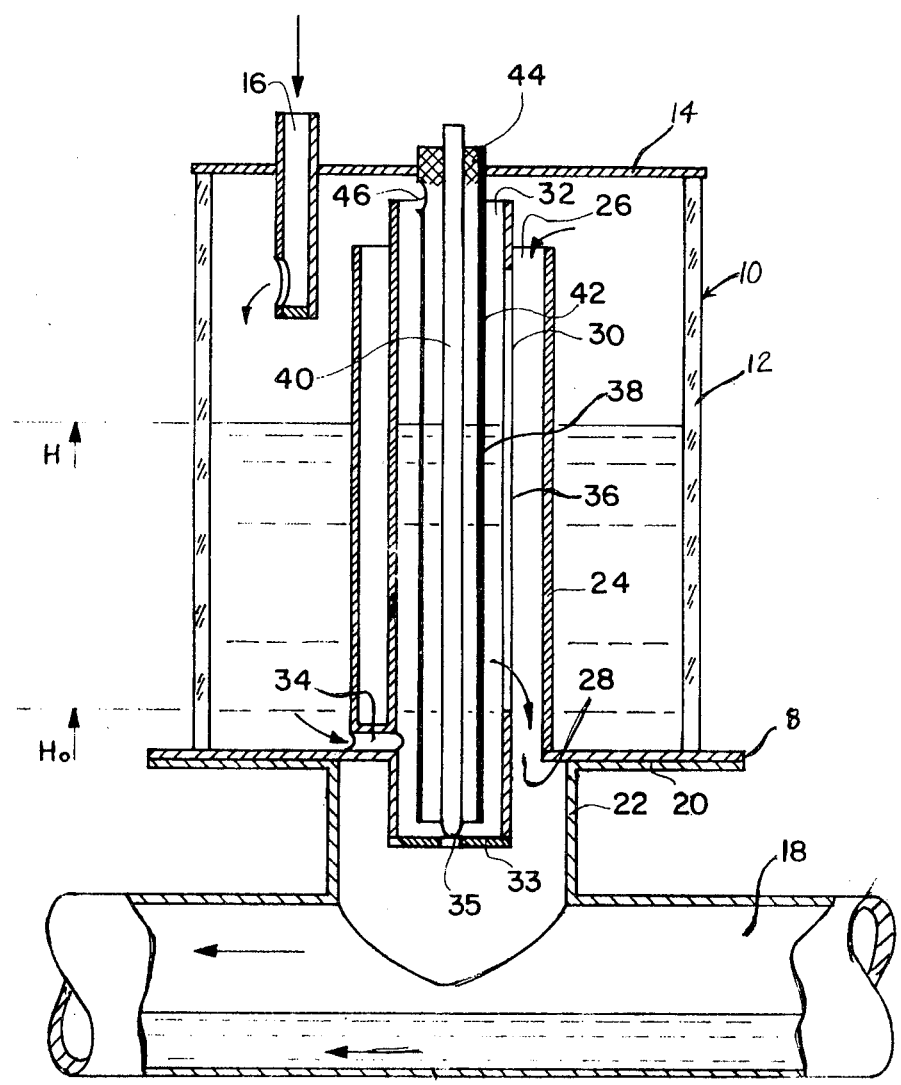
FIG. 1 is a schematic sectional illustration of milk flow measurement apparatus constructed and operative in accordance with an embodiment of the present invention.

Reference is now made to FIG. 1 which illustrates milk flow measurement apparatus constructed and operative in accordance with an embodiment of the present invention. The apparatus comprises an outer container 10, typically formed of a cylindrical section of transparent plastic material 12 of inner diameter 150 mm and height 200, so as to have a typical inner volume of 3.5 liters. A top member 14 is sealingly joined to the top of material 12 and is formed with a milk entry passageway 16 extending therethrough and communicating with the interior of container 10. Container 10 is arranged to be mounted in an upstanding orientation on a milk flow line 18 which is maintained under vacuum, and in vacuum communication therewith. It is appreciated that the milk flow line 18, the outer container 10 and all of the other elements described hereinafter may be constructed by any suitable material, such as plastic or metal.

Container 10 is mounted on a mounting flange 20, which is typically formed as an extension of a neck element 22 formed integrally with milk flow line 18. A bottom member 8, which is sealingly joined to section 12 and forms the bottom of the container 10 rests on flange 20 and may be removably and sealingly attached thereto as by screws.

Disposed within container 10 is an upstanding cylindrical member 24 having an open top portion 26 communicating with the interior of the container near the top thereof and having a partially open bottom portion 28 communicating with the milk flow line 18 via neck element 22, thereby maintaining vacuum inside container 10 and also providing the vacuum connection for drawing milk into container 10 via milk entry passageway 16.

Disposed interiorly of member 24 and spaced therefrom is an upstanding cylindrical member 30 having an open top portion 32 and a normally closed bottom 33, which may be provided with a selectably openable drainage aperture 35 for use during cleaning of the apparatus.

Cylindrical member 30 extends below bottom member 8 and communicates with the interior of container 10 at the bottom thereof via a passageway 34 which extends alongside bottom member 8 and permits debubbled milk to enter the volume defined by member 30, which will be referred to hereinafter as the measuring volume.

Cylindrical member 30 is provided with a vertical slit 36 which extends from a point just below the top of member 24 to a point, indicated by the line $H_o$ which is slightly above the top of passageway 34. The termination of the slit is arranged to be above the top of passageway 34 so as to prevent the possibility of the milk level dropping below the passageway and the bubbles entering the measuring volume.

Arranged within the measuring volume is a milk height sensor 38, comprising inner and outer electrodes 40 and 42 disposed in spaced coaxial arrangement so as to define a capacitive sensor. Milk in the measuring volume rises between the two electrodes thus determining their capacitance as a function of the height of the milk therebetween.

It is appeciated that any other suitable milk height sensor may be alternatively employed.

Electrodes 40 and 42 are typically connected to the inputs of a sensing and recording device (not shown) which will be described hereinafter. The electrodes are mounted within container 10 by means of a sealed mounting element 44 which is sealingly mounted in top member 14. An aperture 46 is formed near the top of the outer electrode 42 permitting communication with the interior of container 10 to provide pressure equalization therebetween.

It is a particular feature of the present invention that the rate of milk flow out from the measuring volume via slit 36 has a known functional relationship with the milk level in the measuring volume. This relastionship may be expressed generally as follows:

$$Q = K_1 H^{3/2}$$

where
Q is the flow rate
K is a constant based on the slit configuration and other factors
H is the height of the milk in the measuring volume.

Figure 2:
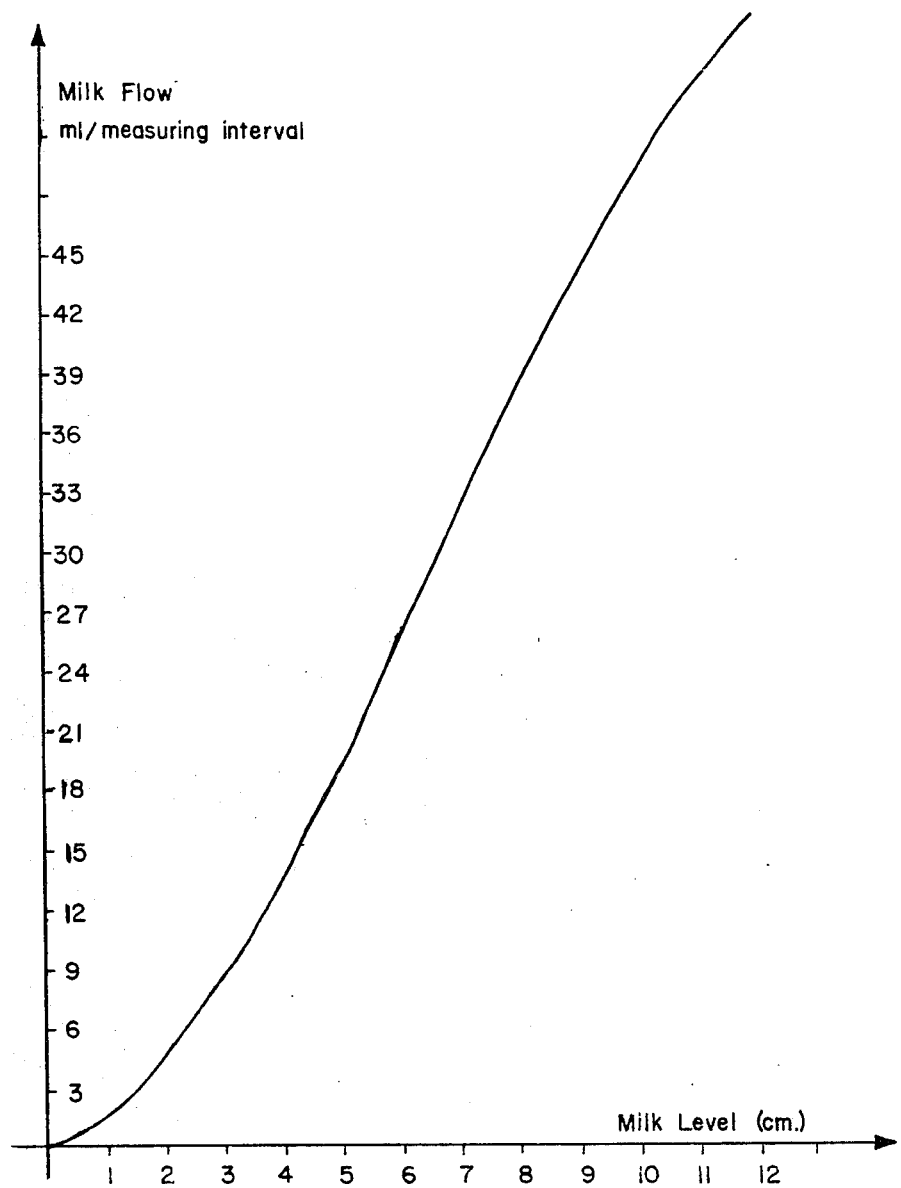
FIG. 2 is a graph showing the relationship between milk flow and milk level for a preferred embodiment of the invention illustrated in FIG. 1 and having a vertical slit width of 1.6 mm.

In practice, the functional relationship is determined empirically for each apparatus configuration. Thus, for the preferred embodiment illustrated in FIG. 1 having the following features:
Width of slit: 1.6 mm
Measuring interval: 0.32 sec
The relationship between flow rate and milk level is given by the graph in FIG. 2.

Figure 3:
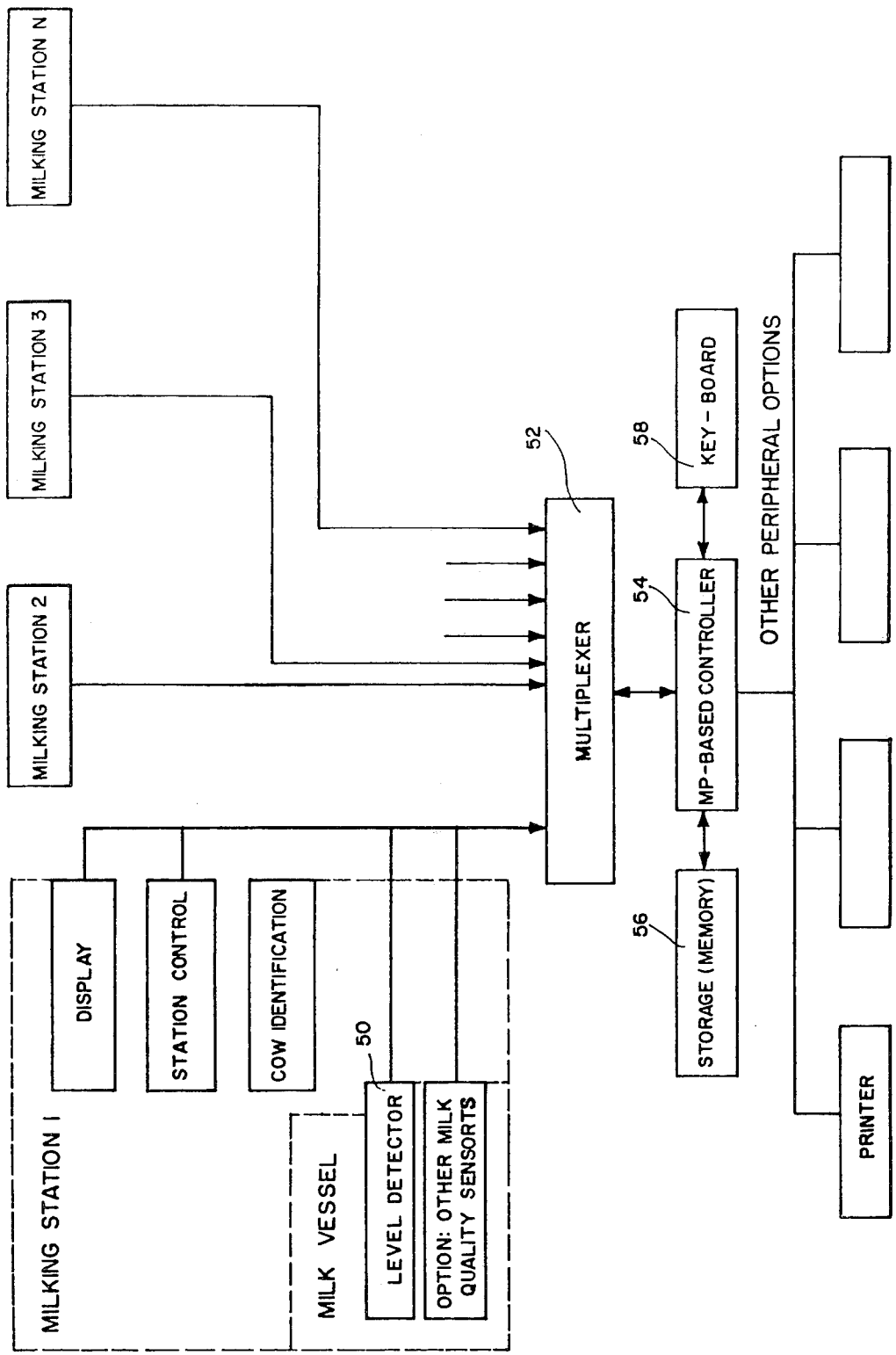
FIG. 3 is a block diagram illustration of the milk flow measurement system constructed and operative in accordance with an embodiment of the present invention.

It is appreciated that the apparatus of FIG. 1 provides an output which indicates the milk flow rate at each time the milk level in the measuring volume is sampled. In order to convert this information into information as to the total milk output of each cow, further computations must be carried out. For this purpose a milk flow measurement, computation and recording/display system is provided, as illustrated in FIG. 3.

A plurality of milking stations are served by common computation control and recording/display apparatus. Each milking station comprises in accordance with a preferred embodiment of the present invention, measurement apparatus 50 of the type illustrated in FIG. 1, providing a level detector output and optionally the outputs of other milk quality sensors. Each milking station also preferably comprises a display, a station control and a cow identification input.

The outputs of the various milking stations, which may be of any desired number are supplied to a multiplexer 52 which interfaces with a microprocessor-based controller 54. Controller 54 may have an external memory 56 and may be coupled to a key-board 58 as well as to other peripheral apparatus such as recording apparatus.

Figure 4:
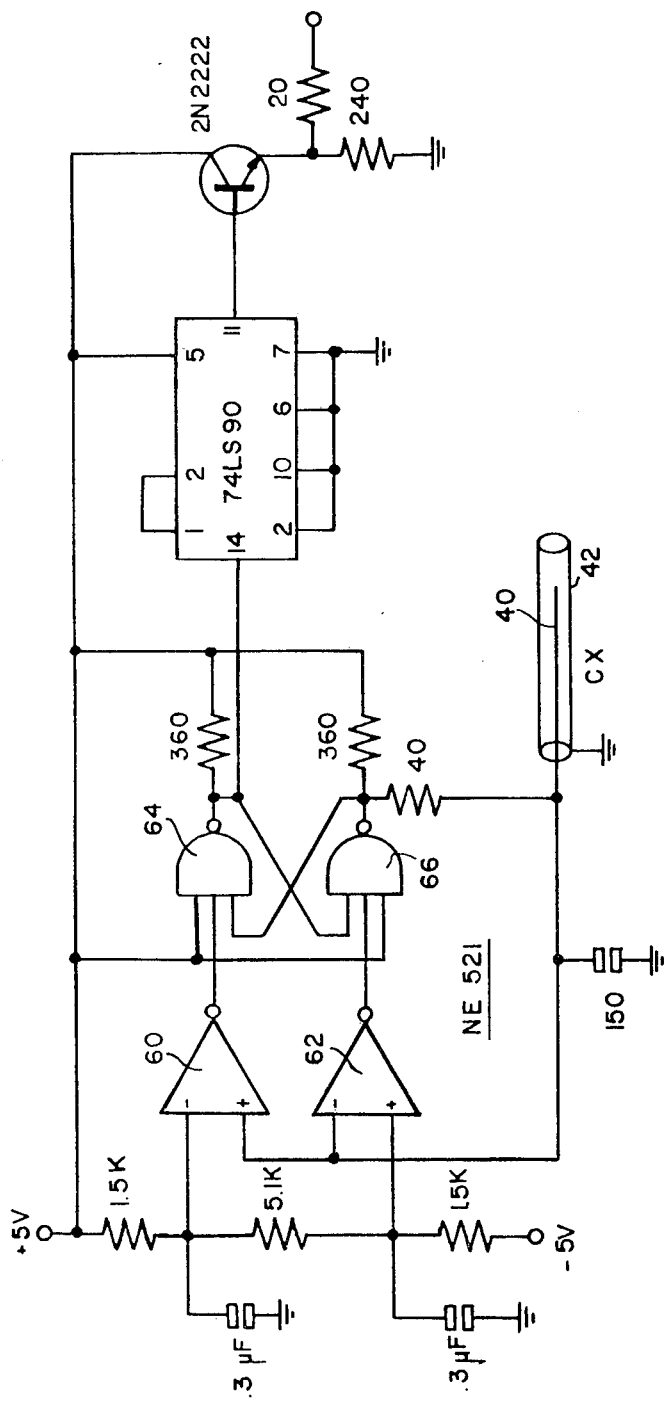
FIG. 4 is a schematic illustration of circuitry associated with the milk level sensor.

Reference is now made to FIG. 4 which is a schematic illustration of circuitry associated with the electrodes 40 and 42 (FIG. 1) for operation thereof as a capacitive sensor in a sampling mode.

Outer electrode 42 is typically coupled to ground, while the inner electrode is coupled to a frequency generator based on a NE 521 chip comprising a pair of operational amplifiers 60 and 62 which output to interconnected NAND gates 64 and 66, the inner electrode 40 being connected to the positive input of operational amplifier 60 and to the negative input of operational amplifier 62. The output of the frequency generator is supplied to a 74LS90 chip which functions as a frequency divider and outputs to the base of a 2N2222 transistor whose emitter provides an output signal frequency which varies as a function of the milk level at electrodes 40 and 42.

Figure 5:
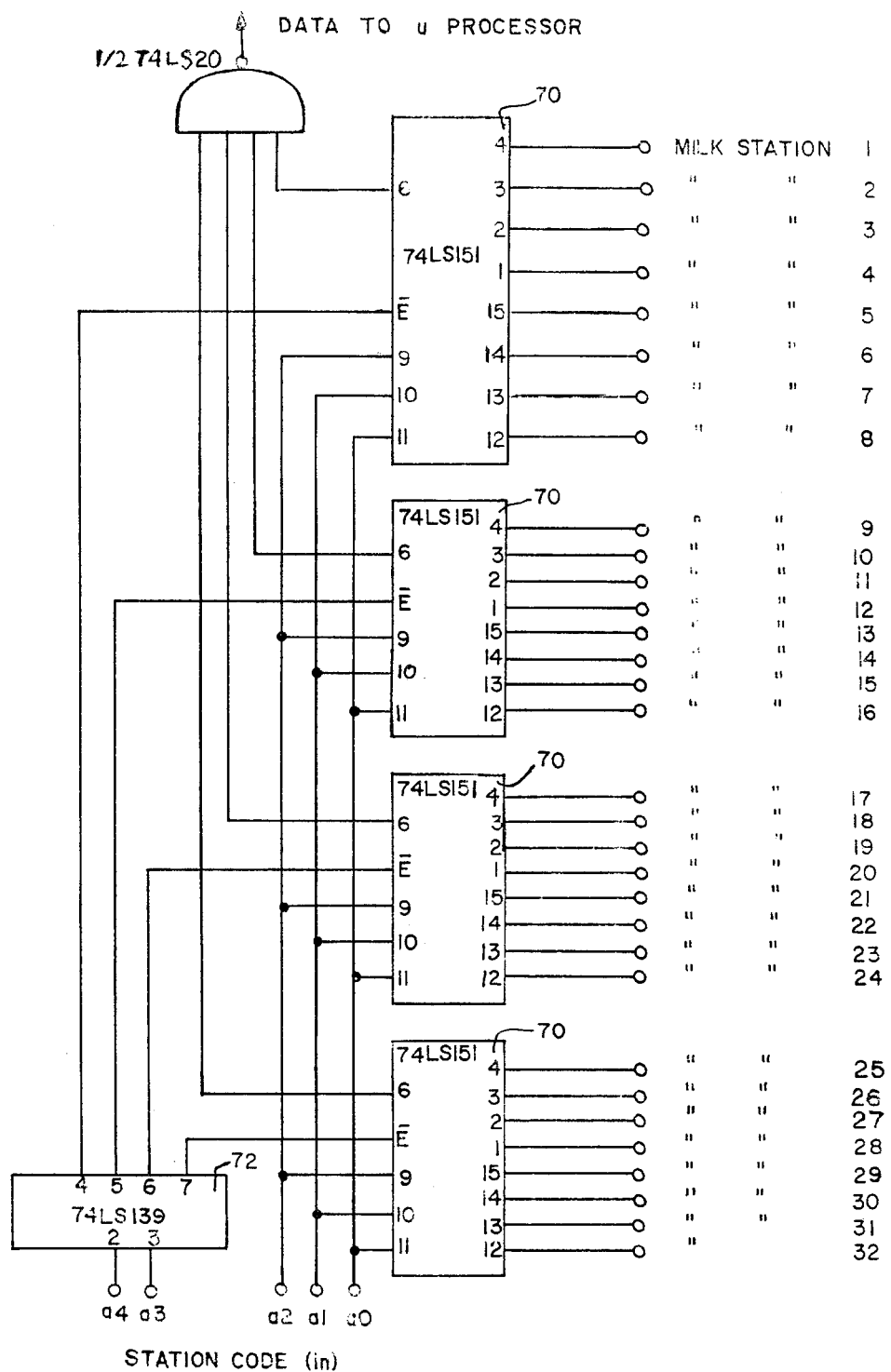
FIG. 5 is a schematic illustration of circuitry comprising the multiplexer of FIG. 3.

FIG. 5 is a schematic illustration of multiplexer 52 (FIG. 3), which comprises a plurality of 74LS151 chips 70 having a plurality of inputs, each of which is connected to a milking station.

Each of the chips 70 also receives a three bit station code input as well as an enable input from the output of a 74LS 139 chip 72 which in turn receives two additional bits of the station code input. Each of the chips 70 provides an output to a NAND gate 74, which comprises one half of a 74LS20 chip and whose output is supplied to controller 54 (FIG. 3).

Figure 6:
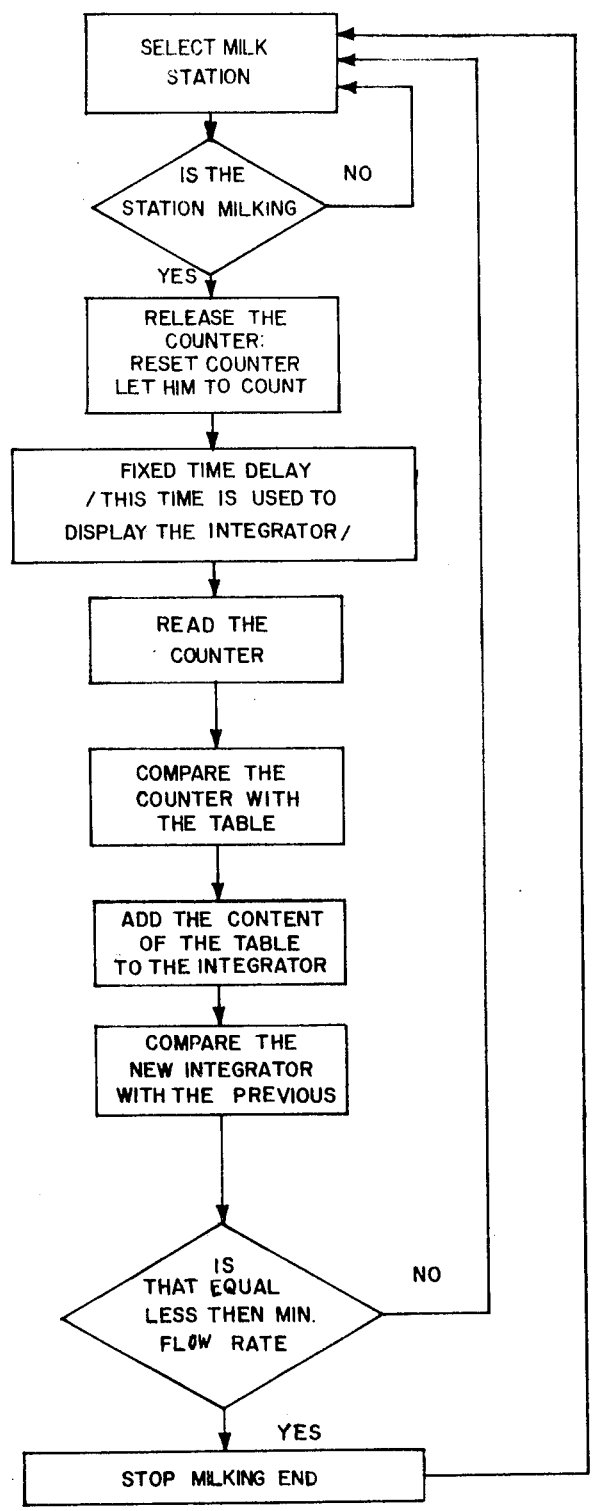
FIG. 6 is a flow-chart illustrating operation of the system of FIG. 3.

The operation of controller 54 will now be described with reference to the flow chart of FIG. 6 which illustrates the operation thereof. The sequence of controller operation begins with selection of a milking station by the controller, followed by an inquiry whether the station is milking. If No, another station is sampled, if Yes, a counter is allowed to begin counting for a fixed time delay, the output from the circuitry of FIGS. 4 and 5. It is appreciated that the number of pulses received by the counter over the fixed time delay are indicative of the milk level in the measured volume.

The counter is read at the end of the fixed delay and the counter contents are referred to a look up table which indicates the milk flow rate corresponding to the number of received pulses in the counting period.

The flow rate indicated by the table is compared with the previously recorded flow rate and an adjustment is made to integration rate accordingly for providing an accurate total milk flow indication. In addition, if the flow rate is sensed to fall below a predetermined minimum level, the milking process termination signal is generated.

It is appreciated that so long as the flow rate does not fall below the predetermined minimum, the controller continues to periodically sample the milk flow rate, typically every 300 ms. and updates the integration rate so as to provide an accurate total milk flow count.

It will be appreciated by persons skilled in the art that the milk flow measurement apparatus of the present invention is entirely electronic in its operation and employs no moving parts. It incorporates in a single container apparatus for debubbling milk and for ensuring that only debubbled milk reaches the measurement volume.

The particular dimensions and configurations described herein are provided only for purposes of example and illustration and may be varied within suitable limitations, care being taken that sufficient space is provided for the milk flow out of the measuring volume via the slit so as not to interfere with or restrict such flow.

The invention is not limited to what has been particularly shown and described herein, rather the scope of the invention is defined only by the claims which follow:

I claim:

1. Apparatus for milk flow measurement comprising:
   debubbling means for receiving milk which may contain bubbles and removing bubbles therefrom;
   measuring apparatus receiving milk from said debubbling means and having an outlet the rate of outflow therethrough being a predetermined function of the amount of milk contained therein; and
   means for sensing the amount of milk contained in said measuring apparatus, thereby to determine the rate of flow; and
   wherein said debubbling apparatus comprises a first container and said measuring apparatus comprises a second container disposed within said first container and connected thereto by a passageway which communicates with the bottom of said first container to permit only debubbled milk to enter said measuring apparatus.

2. Apparatus according to claim 1 and also comprising:
   means for integrating the rate of flow over the duration of a milking event to determine the total milk flow.

3. Apparatus according to claim 1 and also comprising means for periodically sampling the amount of milk contained in said measuring apparatus.

4. Apparatus according to claim 1 and wherein said means for sensing comprises means for sensing the height of milk in said measuring apparatus.

5. Apparatus according to claim 1 and wherein said outlet comprises a vertical slit arranged in said measuring apparatus.

6. Apparatus according to claim 1 and wherein the rate of milk outflow through said outlet is a function of the height of the milk in said measurement apparatus.

7. Apparatus according to claim 1 and wherein said means for sensing comprises a capacitive sensor.

8. Apparatus according to claim 7 and wherein said capacitive sensor is coupled to a frequency generator so as to produce an output whose frequency is a function of the milk level sensed by said capacitive sensor.

9. Apparatus according to claim 1 and also comprising means coupled to the output of said sensing means for periodically sampling said output and integrating the flow rate represented thereby over the duration of milking.

10. Apparatus according to claim 1 and also comprising means for recording total flow for a plurality of milking events.

11. Apparatus according to claim 1 and also comprising means for displaying total flow for selectable milking events.

12. Apparatus for milk flow measurement comprising:
   an outer container arranged to receive milk and permit the bubbles therein to rise;
   an inner container disposed within said outer container and receiving milk from the bottom thereof, said inner container being formed with a vertical outlet slit communicating with a vacuum milk flow line, said outlet slit being arranged such that the rate of milk outflow therethrough is a predetermined function of the milk level in said inner container; and
   a milk level sensor disposed within said inner container for measuring the milk level therein.

* * * * *